United States Patent [19]

Andrews

[11] B 3,999,219
[45] Dec. 21, 1976

[54] TAPE CARTRIDGE PLAYER WITH CARTRIDGE PULL-IN MECHANISM

[75] Inventor: Dallas Roy Andrews, Kirklin, Ind.

[73] Assignee: RCA Corporation, New York, N.Y.

[22] Filed: Aug. 13, 1974

[21] Appl. No.: 496,964

[44] Published under the second Trial Voluntary Protest Program on April 20, 1976 as document No. B 496,964.

Related U.S. Application Data

[63] Continuation of Ser. No. 306,397, Nov. 14, 1972, abandoned, which is a continuation-in-part of Ser. No. 103,552, Jan. 4, 1971, abandoned.

[52] U.S. Cl. .................................. 360/92; 360/93
[51] Int. Cl.² .................. G11B 23/04; G11B 5/008; G11B 15/29
[58] Field of Search ............... 360/92, 93, 132; 226/29; 242/180–181, 197–200

[56] References Cited

UNITED STATES PATENTS 3,643,962  2/1972  White ............................... 360/92
3,733,078  5/1973  Staar ................................ 360/92

*Primary Examiner*—Alfred H. Eddleman
*Attorney, Agent, or Firm*—Eugene M. Whitacre

[57] ABSTRACT

A tape cartridge player includes a plurality of receptacles adapted to receive a plurality of cartridges of the endless loop variety wherein magnetic tape within the cartridge is passed around a pressure roller and across a plurality of openings at its forward end. The cartridges are of the type eaching having a detent notch intermediate their front and rear ends. A spring biased member is provided adjacent each of the receptacles and is engageable with its associated cartridge detent notch to displace the cartridge from a first position within the receptacle—with the tape within the cartridges out of engagement with the player transducer assembly and capstan—to a second position where the tape is sandwiched between the cartridge pressure roller and the player capstan. In this second position, the tape contacts, and is propelled across, the transducer assembly.

Each of the plurality of tape cartridges may be manipulated by a plurality of pawl mechanisms which cooperate with the detent notch of a different one of the plurality of tape cartridges. The pawl mechanisms are operated by a plurality of cooperating cams mounted on a rotatable shaft. The angular position of the shaft controls the position of each of the cams to position its corresponding pawl mechanism in one of at least three positions. In the first position, the pawl mechanism is disengaged from the cartridge detent notch. In the second and third positions, the pawl mechanism engages the detent notches, the second position maintaining the cartridge spaced apart from the player transducer assembly and capstan, and the third position maintaining the cartridge in engagement with the player transducer assembly and capstan.

22 Claims, 12 Drawing Figures

TAPE CARTRIDGE PLAYER WITH CARTRIDGE PULL-IN MECHANISM

This is a continuation of application Ser. No. 306,397, filed 11-14-72, now abandoned, which is a continuation-in-part of U.S. Pat. application Ser. No. 103,552, filed Jan. 4, 1971, now abandoned, and entitled, "TAPE CARTRIDGE PLAYER WITH CARTRIDGE PULL-IN MECHANISM." The present invention pertains to tape cartridge players, and more particularly to tape cartridge players of the type which include a cartridge pull-in mechanism.

When magnetic tape is played in a tape player, it is desirable that the magnetic tape be moved at a very constant linear speed to insure that the reproduced information will be free of wow and flutter. In endless loop type tape cartridges, this requires that the magnetic tape be held between the player capstan and cartridge pressure roller with a sufficient force so that the tape is positively driven and tape slippage does not occur. However, where excessive force is exerted between the player capstan and the tape pressure roller, a rapid wearing of the capstan and pressure roller bearing surfaces occur.

In tape cartridge players of the type wherein the tape cartridge is automatically pulled into and ejected from the tape player, control of the force between the cartridge player capstan and the cartridge pressure roller is difficult. Prior art tape cartridge players effect pull-in and engagement of the cartridge with the player mechanism by manipulating the cartridge from its rear surface. Thereafter, the tape cartridge is ejected under the action of a bias spring or spring loaded lever which pushes against the forward portion of the tape cartridge.

Unfortunately, wide variations have been found between the length of cartridges of different manufacturers. Because of these differences, prior art pull-in mechanisms have been confronted with the problem of spring tension variation when cartridges of different manufactureres are played. The problem arises because the pull-in mechanism must be able to accommodate cartridges that vary substantially in length and therefore must have a yieldable member or spring in the pull-in mechanism. Thus, if the cartridge pull-in force which establishes the force exerted between the pressure roller and the capstan will vary from cartridge to cartridge and result in a given cartridge being pulled in with either too small a force —which could cause tape slippage —or too great a force—which could damage the capstan and the pressure roller bearing surfaces.

A tape cartridge player embodying the present invention, on the other hand, includes a plurality of receptacles which receives a plurality of tape cartridges of the type including a detent notch. The cartridges are each initially inserted within a different one of the plurality of receptacles so as to be spaced apart from the player tape operating means—the disengaged position. Engagement means are included, however, and are associated with each of the plurality of receptacles for engaging the tape cartridge detent notch of the tape cartridge within its corresponding tape receptacle to bear against one of the notch walls and move the cartridge from the first position to a second position where the cartridge becomes engaged with the player operating means. The engagement means may also be operable to bear against another detent notch wall and move the cartridge back to its first position when tape disengagement is desired. Means are provided for sequentially actuating each of the engaging means to move the tape cartridge within its associated receptacle from the first position to the second position.

A complete understanding of the invention may be obtained from the following detailed description of a specific embodiment thereof, when taken in conjunction with the accompanying drawings, in which.

Figure 1:
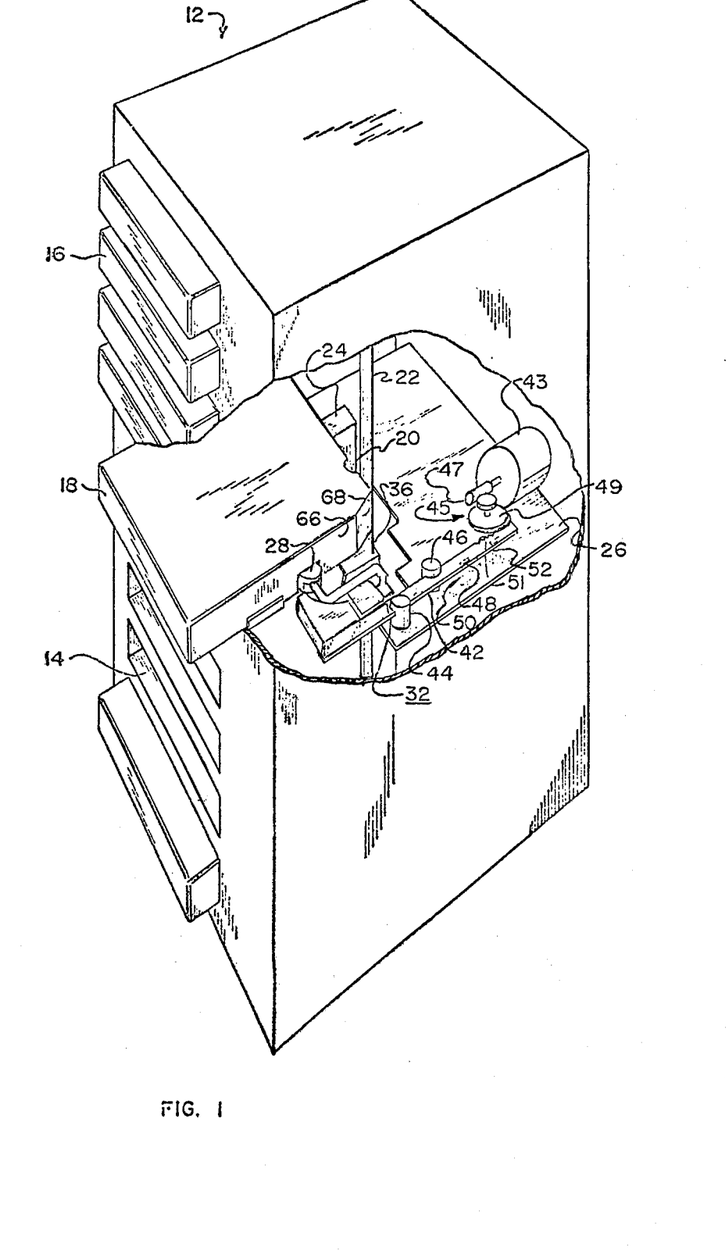
FIG. 1 is a perspective view of a cartridge tape player emboding the present invention, which is partially broken away to show the player pull-in mechanism.

Referring now to FIG. 1, a tape cartridge player 12 includes a plurality of cartridge receptacles 14. A series of tape cartridges 16 are shown inserted into several of the cartridge receptacles. The tape cartridges may be of the endless loop variety, for example. Type III cartridges as specified in the EIA standard RS-332, published in 1967 by the Electronic Industries Association. One of the tape cartridges 18 is shown engaged with the player mechanism.

The pressure roller 20 of the tape cartridge 18 bears against a capstan 22 which is mounted for rotation between the top and bottom of the player such that it may be used to propel the magnetic tape of any tape cartridge 16 within the array of cartridge receptacles 14. The magnetic tape, of the tape cartridge 18, which is not shown, is sandwiched between the cartridge pressure roller 20 and the player capstan 22 to be propelled past a transducer head assembly 24 which is mounted on a vertically movable platform 26.

Figure 2:
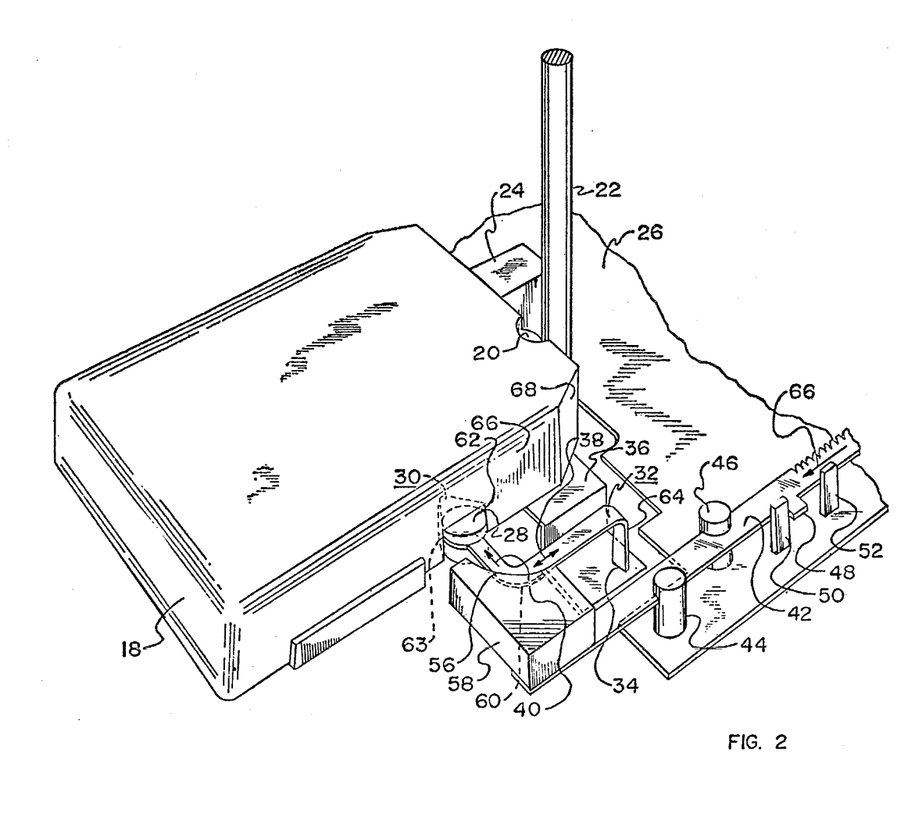
FIG. 2 is an enlarged partial perspective view of the pull-in mechanism shown in FIG. 1 with the tape cartridge in its non-engaged position.

As additionally shown in FIG. 2, a circular shaped member 28 is urged into a detent notch 30 of the cartridge 18 by a spring 32. The spring 32 is anchored at its end 34 to a projection 36 associated with the cartridge receptacle position 14. The spring 32 is bent in a manner such that it is movable in the direction of the arrow 38 and additionally exerts a force in the direction of the arrow 40 toward the cartridge detent notch.

Figure 3:
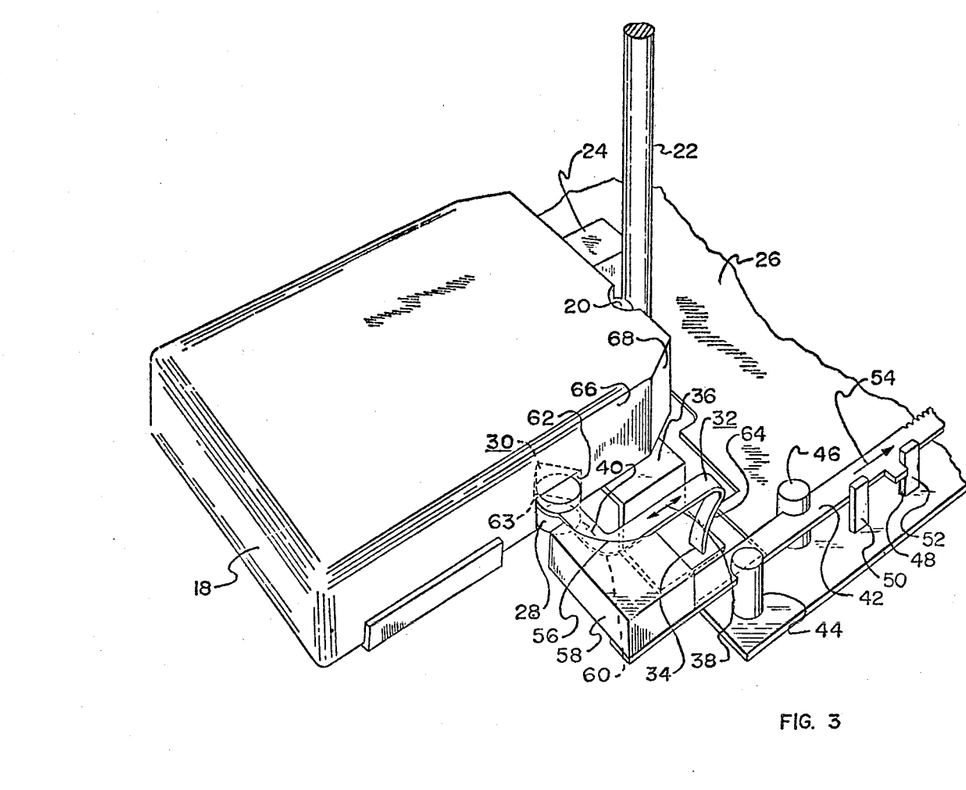
FIG. 3 is an enlarged partial view of the pull-in mechanism shown in FIG. 1 with the tape cartridge engaged with the cartridge tape player capstan and transducing elements.

To manipulate the cartridge into engagement with the player capstan 22 and transducer 24, the movable platform 26 is first positioned to place a reciprocating lever 42 adjacent the spring 32. When this occurs, the transducer 24 on the platform 26 will be in proper vertical relationship to the tape within the cartridge 18. The reciprocating lever 42 has a projection 48 which limits its slides within slotted guide pins 44 and 46, as determined by the relative positioning of platform stops 50 and 52 between which the projection 48 moves. The reciprocating lever 42 is driven by a reversible motor 43 which is coupled to the lever by a gearing arrangement 45 (FIG. 1). In this manner, the reversible motor, depending upon the direction of rotation of the motor shaft 47, will drive the reciprocating lever 42 through a gear 49 and ratchet 51 in the direction of the arrows 54 (FIG. 3) and 66 (FIG. 2).

When the reciprocating lever 42 is moved in the direction of the arrow 54, the cam surface 56 of a block 58 mounted to the lever 42 bears against a cam follower surface 60 of the spring 32. The cam and cam follower surfaces 56 and 60 are dimensioned so that the initial forward motion of the reciprocating lever 42 to the right urges the spring 32 in the direction of the arrow 40 to firmly seat the member 28 in the cartridge notch 30. Further forward motion of the reciprocating lever 42 causes the member 28 to bear against the forward wall 62 of the notch 30 to urge the cartridge 18 toward the player capstan 22 and transducer assembly 24. As the reciprocating lever moves forward to the right, the spring 32 is deflected to the position shown in FIG. 3, with the spring biased in the direction of the arrow 40 and the base 64 of the spring 32 angled with respect to the receptacle platform extension 36.

It should be noted that, for interchangeability of cartridges and players, the above-identified EIA standards for Type III cartridges specifies on page 2, paragraph 4.4, that the tape cartridge player should have a one-quarter inch diameter capstan shaft which is pushed into the pressure roller with a force of three pounds along the common center line of the player capstan 22 and cartridge pressure roller 20. Moreover, EIA standards also specifies on page 7 the distance between the front end of the cartridge and a predetermined point in the cartridge notch with a tolerance of 0.030 inch. Thus, tape cartridge 18 is manipulated at a relatively precision point with respect to the cartridge front end and the pull-in mechanism can accommodate cartridges of differing manufacturers with minimal variation of the player capstan-cartridge pressure roller bias force.

When the cartridge is to be returned to its nonengaged position, that is, the detent position within the cartridge receptacle 14 shown in FIGS. 1 and 2, the motor 43 is reversed to move the reciprocating lever 42 rearward in the direction of the arrow 66. This moves the cam surface 56 of the block 58 backwards and permits the spring 32 to move back to its original position. Thus, the base 64 of the spring 32 moves toward a perpendicular position with respect to the receptacle platform extension 36 (FIG. 2). After it has gained its vertical position, continued rearward motion of the reciprocating lever 42 to the left permits the spring 32 to deflect in a direction opposite to that of the arrow 40 to diminish the detent force that the member 28 exerts against the cartridge notch 30. During the rearward excursion of the reciprocating lever 42, the detent member 28 bears against the rear wall 63 of the cartridge 30 to disengage the cartridge from the player capstan 22 and transducer assembly 24.

To remove a cartridge, such as cartridge 18, positioned as shown in FIGS. 1 and 2, from the receptacle 14, the cartridge is grasped at its rear surface and is drawn away from the tape cartridge player 12. Withdrawing the cartridge 18 causes the member 28 to ride out of the cartridge notch 30. As the cartridge is withdrawn, the portion 64 of the spring 32 initially moves in the direction of the withdrawing cartridge 18. Continued rearward motion of the cartridge 18 causes the portion 64 of the spring 32 to be urged backward and to ride out from the cartridge notch 30. The member 28 bears against the side wall 66 of the cartridge 18 as it is withdrawn from the receptacle 14.

When a cartridge, such as cartridge 18, is inserted into the receptacle 14, the sloped portion 68 of the cartridge side wall initially bears against member 28 and deflects it in the opposite direction of the arrow 40 such that the member 28 rides along the ramp surface 68 and onto the side wall 66 of the cartridges until it falls into the cartridge notch. It should be noted that the dimensional tolerances between the cam surface 56 of the block 58 and the surface 60 of the spring 32 are sufficient to permit the member 28 to move along the cartridge side wall 66 without the surfaces 56 and 60 interfering.

It should be recognized that while the invention is described in the context of an automatic multiple tape cartridge player, the invention is suitable for use in any tape cartridge player of the type wherein a tape cartridge is to automatically be manipulated between an engaged and disengaged position with respect to the player capstan and transducer elements.

Reference is now made to FIGS. 4-12 where in like reference numerals are utilized to designate similar elements in the various FIGS. A tape cartridge changer is housed within a cabinet assembly 112. The changer is adapted to play endless loop tape cartridges. One such cartridge (often termed the "Stereo-8" type tape cartridge) incorporates a rotatable core and platform assembly around which is wound an endless loop of magnetic tape. As the core and platform assembly is rotated, the innermost convolution of tape adjacent the core is pulled out from the tape pack and passed across openings in the forward portion of the tape cartridge housing and around a pressure roller. Thereafter, the tape is wound around the outermost convolution of the tape.

Figure 4:
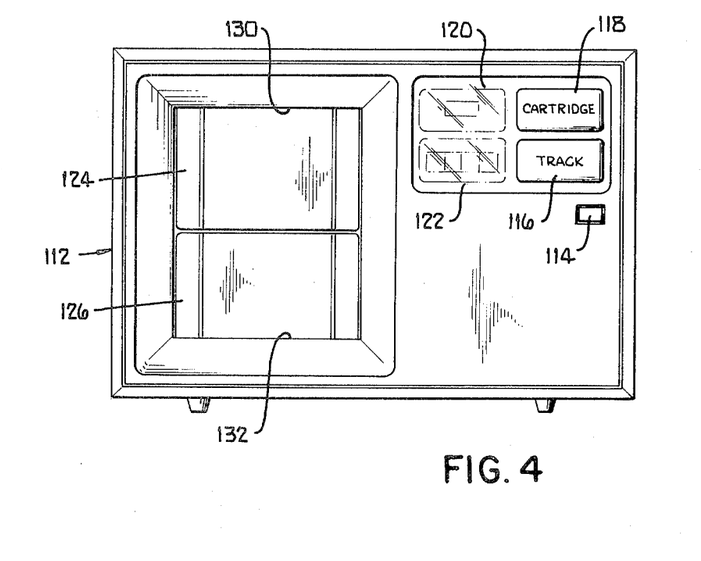
FIG. 4 is a front elevation view of a cartridge magazine type tape cartridge changer embodying the present invention.

The tape cartridge player includes an ON-OFF control 114, a track control 116, and a cartridge control 118. The front panel of the cabinet includes an indicator 120 for indicating the particular one of the plurality of tape cartridges which is being played and an indicator 122 for indicating the particular set of magnetic tracks being played on the selected cartridge. The tape player cabinet 112 additionally includes two doors 124 and 126 adapted to permit insertion of a tape cartridge magazine 128 into operative engagement with the tape changer operating mechanisms. The door 124 is hinged at an upper cabinet surface 130 and the door 126 is hinged at a lower cabinet surface 132. The doors 124 and 126 are spring biased closed (as shown in FIG. 4) and are deflected inward, toward the tape changer operating mechanism, when the tape cartridge magazine 128 is inserted through the doors into the changer.

Figure 5:
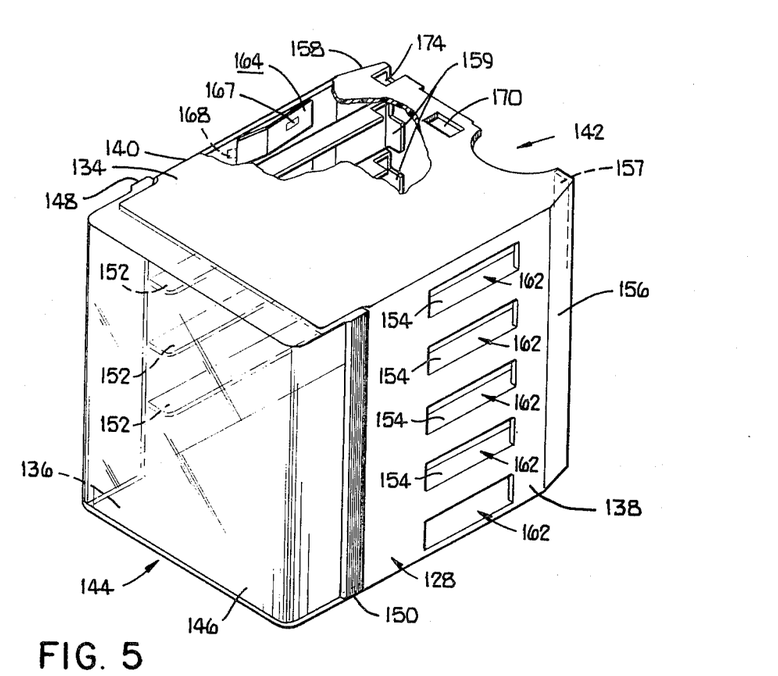
FIG. 5 is a perspective view, partially broken away, of a tape cartridge magazine adapted to be used in conjunction with the tape cartridge changer shown in FIG. 4.

The tape cartridge magazine 128 includes a top surface 134 and a bottom surface 136 which are maintained in fixed spaced relationship by the side members 138 and 140. The top, bottom and side members define an enclosure having a front opening 142 and a rear opening 144. A translucent cover 146 is detachably secured to close the enclosure rear opening 144. The cover 146 is attached to the tape cartridge magazine 128 by means of yieldable arms 148 and 150 which engage cooperating ribs, not shown, in the cartridge magazine sides 138 and 140.

With the cover 146 removed, tape cartridges are loaded into the magazine 128 through the enclosure rear opening 144. The cartridges are supported within the magazine enclosure by a plurality of rails 152 attached to the magazine side 140 which cooperate with a corresponding plurality of rails 154 attached to the magazine side 138. Corresponding rails on the magazine sides 138 and 140 cooperate to support different ones of the tape cartridges inserted within the magazine enclosure in a vertically stacked array. The lowermost cartridge of the array is supported by the magazine bottom surface 136.

The front opening 142 of the magazine is smaller than the rear opening 144 of the magazine to prevent tape cartridges supported within the enclosure from being expelled through the magazine front opening. The magazine side members 138 and 140 have respective portions 156 and 158 which are sloped toward each other to reduce the size of the magazine front opening. A plurality of fingers 159 are additionally attached to the side portion 158 which in conjunction with the portion 157 of the sloped portion 156 insures that the tape cartridges supported within the magazine enclosure cannot be forced against the sloped side portion 156 and 158 and possibly become wedged. It will be noted that the top, bottom and side portions of the magazine generally conform to the shape of the tape cartridges to be played such as tape cartridge 160 (shown in FIGS. 6–10). A plurality of slot shaped openings 162 are provided in the magazine side 138. The openings provide access into the interior portion of the magazine enclosure for the operating portion of the tape changer mechanism utilized to manipulate the tape cartridges supported within the magazine 128 into and out of engagement with the changer capstan 163 and transducer assembly 165.

A low coefficient of friction guide 164 is opposite each of the openings 162 and is supported within the magazine enclosure by the side wall 140. Each guide 164 is fabricated from, for example, Teflon, chrome, metal containing or plated with nickel, or some other material having a low coefficient of friction with the cartridge material. Guide 164 is secured to the side wall 140 by a finger 167 and a further finger member 168 (which are hooked to notched surfaces, not shown, in the enclosure side 140). The guide 164 is disposed closer toward the magazine enclosure front opening 142 than the magazine enclosure rear opening 144 and provides a low friction surface for its associated tape cartridge when the tape cartridge is manipulated by the player operating mechanism to move within the tape cartridge magazine 128. The tape cartridge magazine 128, moreover, includes a detent notch 170 which cooperates with a tape player detent roller 171 (FIG. 6) to secure the magazine in proper operating position within the tape changer cabinet 112 when it is inserted through the cabinet doors 124 and 126.

A notched out front portion 174 is provided to enable sensing means (not shown) associated with the cartridge tape changer to enter the front portion of the magazine and sense the type of tape cartridge contained within the magazine enclosure. Specifically, the notched out front portion 174 enables the player sensing device to detect whether the tape cartridge to be played includes a corresponding notched out portion thereby indicating that the endless loop tape cartridge is of the eight track, four track per program type (often termed a "Quad-8" tape cartridge) as opposed to the eight track, two track per program type cartridge (often termed a "stereo-8" tape cartridge). This is in accordance with the EIA standards set forth in RS-332, published in 1967 by the Electronic Industries Association.

As is most clearly shown in FIG. 6–10, a rotatable cam assembly including shaft 176 is adapted to be driven to rotate by a motor 178 and a gear train 180 mounted beneath the tape player lower support plate 182. The shaft 176 is driven to rotate in a counterclockwise direction as shown by the arrow 177 in FIG. 10. The shaft 176 supports a plurality of cams 184, 186, 188, 190, 192, 194, and 196. Cams 184, 188, 192, 194 and 196 are part of the changer tape cartridge manipulating mechanism. Cams 186 and 190 cooperate, respectively, with switches 262 and 282 whose function will be described in detail hereinafter.

Figure 7:
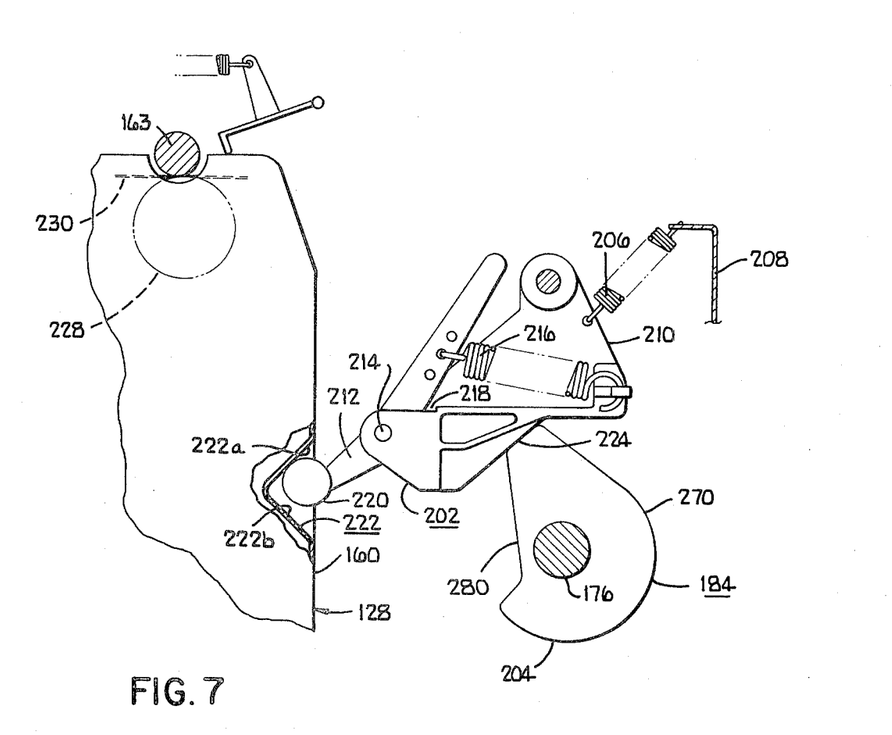
FIGS. 7-9 are enlarged partial top plan views of the tape cartridge manipulating mechanism with the mechanism shown manipulating a tape cartridge to be in different positions with respect to the changer capstan and head assembly.
Figure 8:
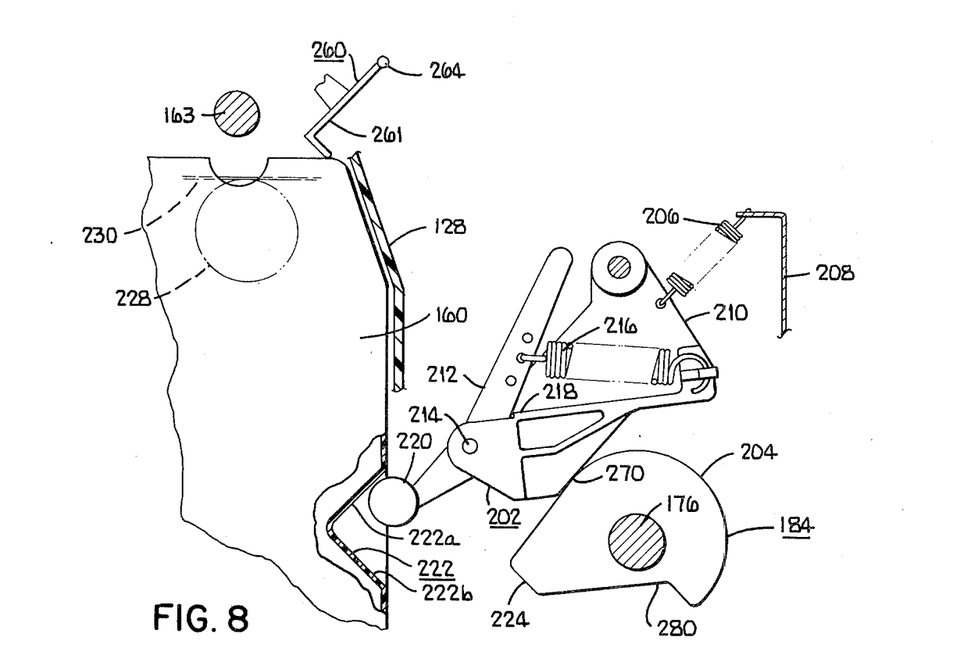
Figure 9:
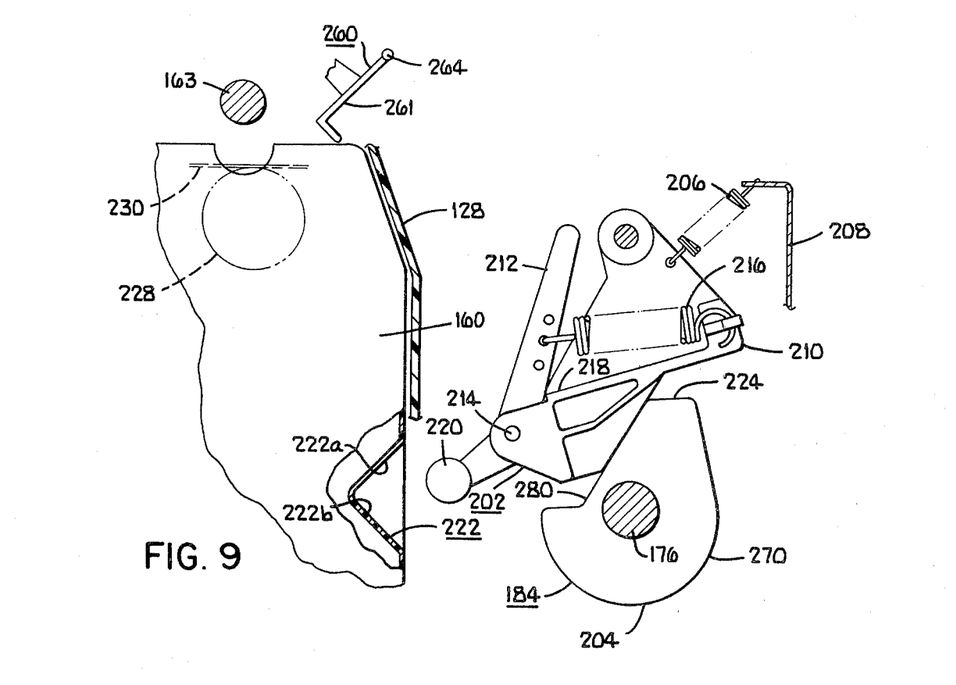

The detailed construction and mode of operation of cam 184 and its cooperating pawl mechanism 202 are shown in the enlarged partial top plan views in FIGS. 7–9. It should be understood that the details of construction, with the exception of the cam surface shape, is identical for each of the plurality of cam and pawl mechanisms within the tape cartridge changer operating mechanism. Consequently, only the detailed construction of cam 184 and its associated pawl mechanism 202 will be discussed in detail.

The cam 184 includes a continuous surface having three portions lying at different radial distances from the center of the rotatable shaft 176. The rotatable shaft 176 is positioned at different angular positions to move its associated pawl mechanism 202 to different positions needed for the manipulaton of tape cartridge 160. Specifically, the cam surface portion 204 engages the pawl member 202 which functions as a cam follower. A spring 206 attached between a support bracket 208 and the pawl member 210 urges the pawl member 210 to bear against the cam 184. A second pawl member 212 is pivotally connected to the pawl member 202 and rotates about a pivot 214. The pawl members 210 and 212 are further interconnected by means of a spring 216 which causes the pawl member 212 to rotate in a clockwise direction about its pivot 214. The pawl member 212 is restricted in its clockwise rotation by a shoulder 218 formed as part of the pawl member 202. The pawl member 212 supports a plastic disc 220 which is adapted to engage the detent notch 222 of the tape cartridge 160 housed within the magazine 128.

The cam portion 224 of cam surface 204 bears against the pawl member 202 (FIG. 7) to cause the disc member 220 to be positioned within the detent notch 222 and position the tape cartridge 160 in operative engagement with the player capstan 163 and magnetic head assembly 165. It will be noted that the capstan 163 is a long shaft which is mounted between the player upper support plate, not shown, and lower support plate 182. The capstan 163 is belt driven through a flywheel, not shown, coupled to the capstan below the lower support plate 182 and belt 223 driven by the shaft 225 of the motor 226, shown in FIG. 6. The particular amount of force with which the cartridge pressure roller 228 is urged against the player capstan 163, thereby captivating the magnetic tape 230 within the tape cartridge, is determined by the spring 216.

Figure 6:
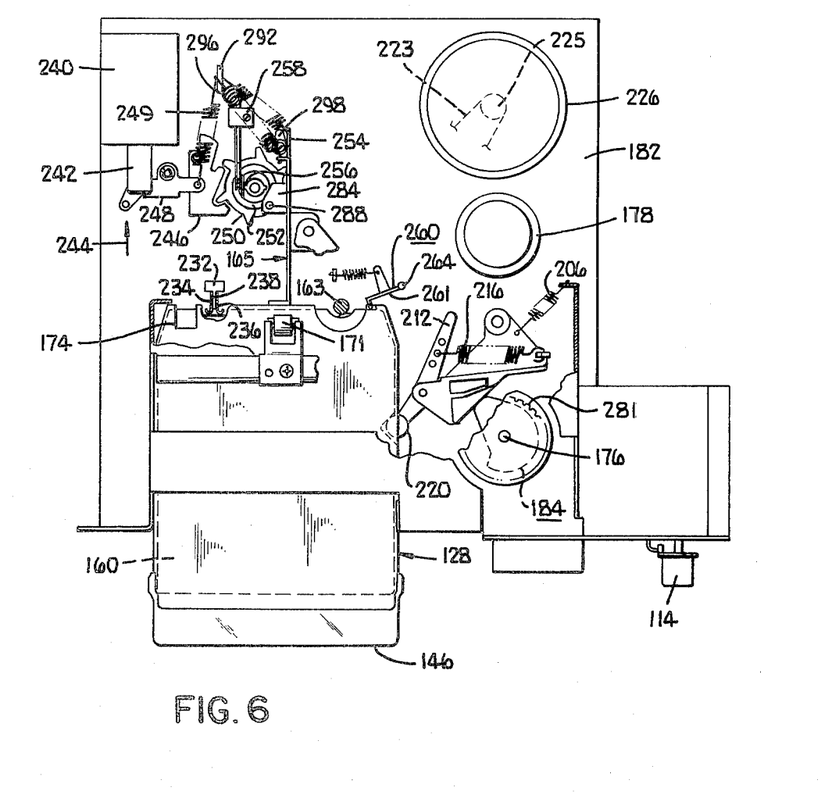
FIG. 6 is a partial top plan view, partly broken away to show details of construction, of portions of the operative mechanism of the tape cartridge changer shown in FIG. 4.

The magnetic tape within each of the tape cartridges is of the type which includes a conductive foil. Each time the endless loop of tape is completely played, the conductive foil passes a foil sensor 232 which is comprised of two plates 234 and 236 separated by an insulating space 238 (see FIG. 6). The two plates 234 and 236 have a plurality of paired projections, at spaced intervals along the plates 234 and 236, the top ones of which are shown in FIG. 6. The number of paired projections corresponds to the number of tape cartridges adapted to be supported within the tape cartridge magazine 128. Corresponding projections on the foil detector plates 234 and 236 engage the magnetic tape within its associated tape cartridge.

As the conductive foil passes the foil detector 232, the conductive surface completes the electrical path between the detector plate 234 and 236. This actuates a solenoid 240 to cause its plunger 242 to move in the direction of the arrow 244. When this occurs, the head ratchet 246 moves in a direction opposite to the direction of the arrow 244 by virtue of the force transmitted from the plunger 242 through the linkage 248. After the conductive foil passes the detector 232 opening space 238 the solenoid 240 is deactivated. Upon deactivation of solenoid 240, the spring 249 through linkage 248 provides return motion of the plunger 242 and through member 246 causes rotation of cam 250. For example, such revolution of cam 250 may comprise a desired fraction of a revolution. Spring 249 maintains the head ratchet 246 in engagement with the cam 250. As the cam 250 is rotated, the stepped cam surface 252 shifts the head assembly 165 mounting plate 254. The magnetic head assembly 165 will be treated in detailed hereinafter; however, it is sufficient for the present purpose to indicate that the mounting plate 254 is shifted transverse to the laterally spaced longitudinal magnetic information tracks on the tape contained within each of the plurality of tape cartridges. This moves the magnetic units of each of the magnetic heads associated with each of the plurality of tape cartridges to operatively engage different ones of the laterally spaced magnetic tracks.

After all of the tracks of the magnetic tape of the particular cartridge being played have been brought into operative engagement with its associated magnetic head unit, when the foil again completes the circuit between the foil detector plates 234 and 236, the cam 250 rotates such that a stud 256 closes a switch 258. Switch 258 is connected to cause motor 178 to be energized to run and drive the shaft 176 to rotate in a counter-clockwise direction. It will be noted that when the motor 178 is energized to run by the action of switch 258, two parallel connected sensing switches 260 and 262 are temporarily bypassed. The sensing switch 260 which cooperates with the cartridge 160 and switch 262 which cooperates with cam member 186 operate in parallel fashion to provide stopping of the motor 178.

The sensing switch 260 includes an L-shaped switch operator 261 which is positioned adjacent the plurality of tape cartridges supported within the tape cartridge magazine 128 when inserted into the tape cartridge changer. The switch operator 261 is manipulated to open the switch 260 by any tape cartridge within the stacked array moved into operative engagement with the player capstan 163 and head assembly 165. The switch operator 261 is pivotally mounted to rotate about a pivot 264 which is substantially parallel to the shaft 176. The motor 178 continues to drive the shaft 176 to rotate through the gear system 180 until a tape cartridge is moved by one of the plurality of pawl mechanisms into operative engagement with the player capstan 163 and transducer assembly 165 such that the front portion of the tape cartridge engages switch operator 261. The switch 260 is opened before the cam 186 opens the parallel connected switch 262. Since both switches must be opened to de-energize motor 178, only cam 186 need be a precision part to insure motor 178 is de-energized at the proper instant to accurately position the shaft 176 and hence the plurality of cams and pawl mechanisms. Motor 178 remains de-energized until the plurality of laterally spaced magnetic tracks on the tape within the next tape cartridge brought into operative engagement with the changer capstan 163 and head assembly 165 has been played. At this time, switch 258 is again actuated and temporarily overrides the sensing switch 260 and 262 to energize the motor 178 to run.

Should a cartridge position within the stacked array of tape cartridges supported within the magazine 128 be left vacant, the pawl mechanism associated with that cartridge position is operated by its associated cam in the manner normally associated with manipulating a tape cartridge. However, since the tape cartridge is absent, the sensing switch 260 is not opened and although the parallel connected motor sensing switch 262 is opened, the motor 178 remains energized and continues to drive the shaft 176. The shaft 176 is driven to rotate until a cam engages an associated pawl mechanism to move the next tape cartridge supported within the stacked array into operative engagement with the player capstan and transducing assembly. This opens the switch 260 and shortly thereafter when the parallel connected switch 262 is opened by cam 186, motor 178 is de-energized.

When the motor 178 is energized to run and causes the shaft 176 to rotate in a counter-clockwise direction, cam surface portion 224 is moved out of engagement with the pawl member 210 and the cam surface portion 270 is moved into engagement with the pawl member 210 (FIG. 8). During the transition period while cam surface portion 224 moves out of engagement with the pawl member 210 and cam surface portion 270 moves into engagement with the pawl member 210, the entire pawl mechanism 202 rotates under the action of spring 206 in a counter-clockwise direction while bearing against the cam 184. This brings the disc 220 which may be rotatable into engagement with the rear wall 222b of the tape cartridge detent notch 222 and moves the tape cartridge 160 to a new position within the tape cartridge magazine 128. The tape cartridge 160 (FIG. 8) is maintained in a fixed position within the cartridge magazine 128 wherein the pressure roller 228 is out of engagement with the changer capstan 163 and the magnetic tape 230 is out of engagement with the changer head assembly 165. The cartridge 160 while in this position is detented within the tape cartridge magazine 128. Even if the magazine rear cover 146 is removed and the changer tilted, cartridge 160 will be retained in proper position with the disc 220 bearing against the cartridge detent notch front wall 222a (FIG. 8). Further, it is to be noted that when a given cartridge is in the playing position as shown and described with respect to FIG. 7, at the same time any remaining cartridges in the magazine 128 are disposed in the detented position shown and described with respect to FIG. 8. Thus, it will be understood that the changer system is operable even if the magazine rear cover 146 is not present and the changer tilted.

The shaft 176 is rotated during manipulation of each of the remaining tape cartridges 272, 274, 276 and 278 within the tape magazine 128 until the cam portion 280 engages the pawl member 210 (FIG. 9). In this position, the disc 220 is totally disengaged with the tape cartridge notch 222 and is withdrawn from the associated magazine access slot 162. It will be noted that each of the cams 184, 188, 192, 194 and 196 include a cam surface portion similar to cam surface portion 280 associated with cam 184. These cam surface portions are vertically aligned such that all of the pawl mechanisms 202, 203, 205, 207 and 209 are simultaneously moved out of engagement with the detent notch of their associated tape cartridge and away from the tape cartridge magazine 128. This allows the tape cartridge magazine 128 to be withdrawn from the tape player cabinet 112 without being obstructed by portions of the tape cartridge moving mechanism.

Figure 10:
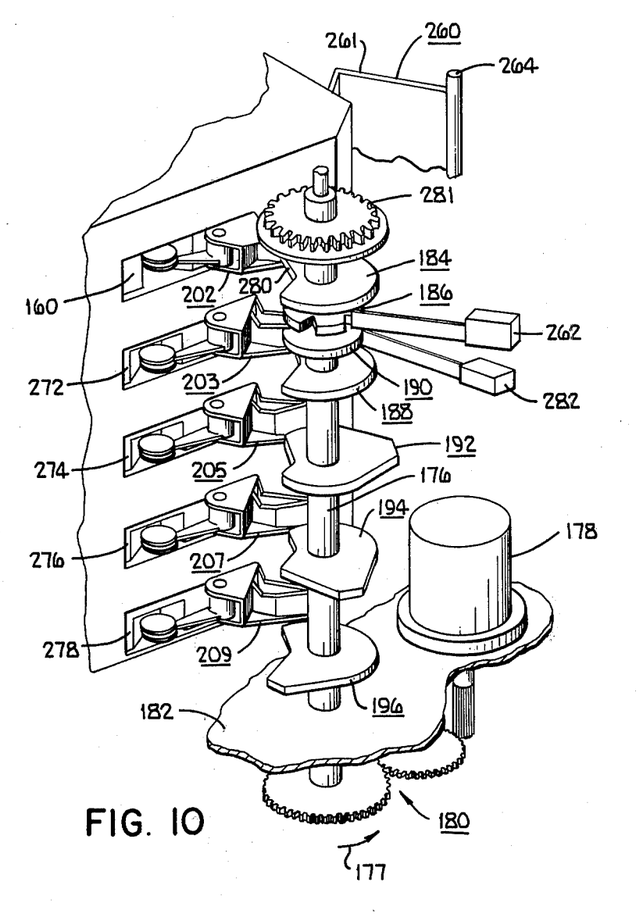
FIG. 10 is a partial perspective view of the tape cartridge manipulating mechanism shown in FIGS. 6-9.

It will be recognized that each of the cams 184, 188, 192, 194 and 196 are differently shaped to have cam surface portions corresponding to cam surface portions 224 of cam 184 positioned in a circular pattern as seen in FIG. 10 taken with FIGS. 8 and 9 which show the shaft 176 and the plurality of cams. This causes sequential operation of each of the tape cartridges within the magazine 128 by moving the pawl mechanisms in a sequential order. The pawl mechanisms are all each first moved from the load position where all the pawls are totally disengaged with the detent notch of each of the plurality of tape cartridges and are withdrawn from the tape cartridge magazine (similar to pawl mechanism 202 as shown in FIG. 9) into a position where the pawl mechanisms 202, 203, 205, 207 and 209 engage the detent notch of their associated tape cartridge to maintain their associated tape cartridge in a ready position. In this position, the tape cartridges within the magazine are maintained in a fixed position spaced apart from the changer capstan 163 and changer magnetic head assembly 165 (similar to the pawl mechanism 202 as shown in FIG. 8). The topmost tape cartridge 160 in the stacked array of tape cartridges, however, is moved into the play position by its associated pawl mechanism 202, being brought into operative engagement with the changer capstan 163 and changer magnetic head assembly 165. As previously described, when the tape tracks have been completely played, the tape cartridge 160 is moved by the pawl mechanism 202 back to the ready position and the next tape cartridge 272 within the stacked array is moved under the action of its associated pawl mechanism from its ready position to the play position. The sequence continues with cartridges 274, 276, and 278 being played, whereupon the rotatable shaft is moved to position the cam surface portion of each of the plurality of cams 184, 188, 192, 194 and 196 to the load position.

A gear 281 is mounted to the shaft 176. The gear 281 drives an indicator drum mounted behind the indicator window 120 to rotate and indicate the particular tape cartridge being played. The remaining cam 190 mounted to the shaft 176 controls a switch 282. Switch 282 functions to keep AC power applied to the changer should the ON-OFF switch 114 be turned off while the changer tape cartridge manipulating mechanism is engaged with a tape cartridge. The AC power is kept on until the shaft 176 is positioned to cause the changer tape cartridge manipulating mechanism to be in the load position. At this time, the operator for switch 282 falls into a notch in cam 190 and the switch opens thereby de-energizing the tape changer.

Figure 11:
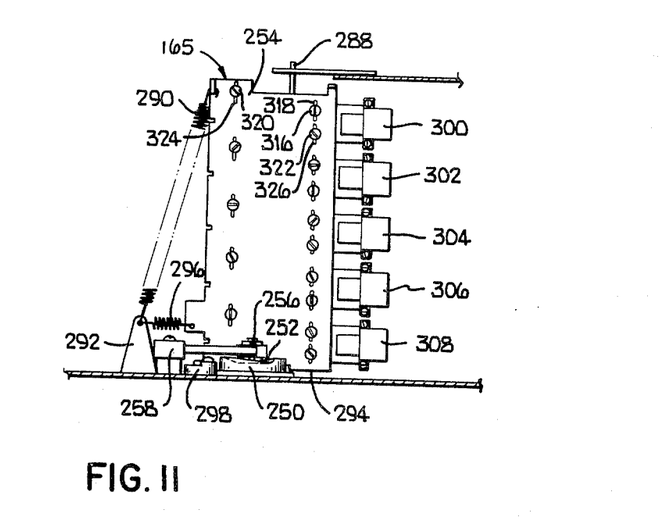
FIG. 11 is a left side view of the tape cartridge changer head assembly shown in FIG. 6.
Figure 12:
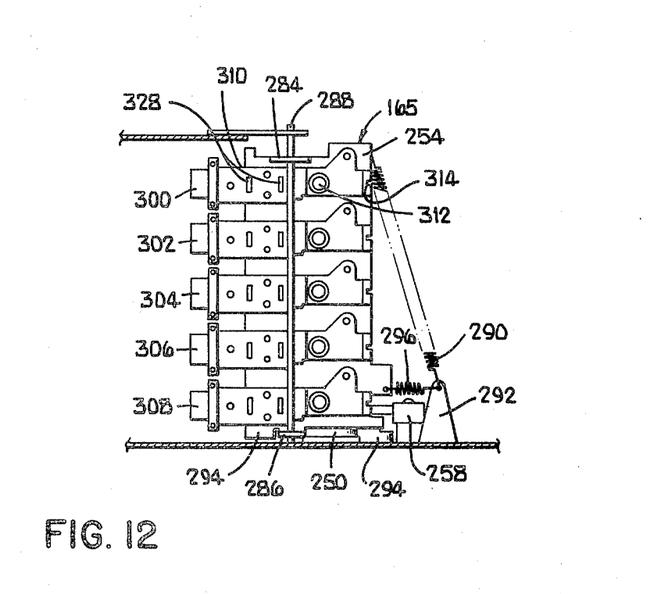
FIG. 12 is a right side view of the tape cartridge changer head assembly shown in FIG. 6.

Referring again to the magnetic head assembly 165, the mounting plate 254 includes two ears 284 and 286 which pivotally mount the mounting plate 254 to a vertical pivot shaft 288. Vertical pivot shaft 288 is substantially parallel to the player capstan 163. Sufficient clearance is left such that the cam 250 can move the mounting plate 254 in a direction transverse to the laterally spaced magnetic tape tracks. A spring 290 is coupled between the mounting plate 254 and a support bracket 292 to urge the edge 294 of the mounting plate 254 to bear against the cam 250 as seen in FIGS. 11 and 12. A second spring 296 is also coupled between the mounting plate 254 and the bracket 292. The spring 296 causes the mounting plate 254 to rotate about its pivot 288 and bear against a locating member 298 to provide proper orientation for the mounting plate and also bias out clearance between the holes in the ears and the shaft 288 to maintain a constant azimuth of the mounting plate 254 without precision parts.

A plurality of magnetic heads 300, 302, 304, 306 and 308 are preferably selectively connected to an amplifier through a rotary switch on shaft 176 both of which are not shown, and are each mounted by screw members to a support arm. The support arms are identical and only support arm 310 for magnetic head 300 will be described in detail. The support arm 310 is pivotally mounted to the mounting plate 254 to rotate about the pivot 312. The axis of the pivot 312 is normal to the major surfaces of the mounting plate 254. A cutout notch 314 is provided in the rear edge of the support arm 310 and the mounting plate 254 to allow the support arm 310 to be pivoted about the pivot 312 from its rear edge, as for example by use of a screwdriver blade. This adjustment provides a height adjustment for the magnetic head 300 mounted to the support arm 310. It will be noted that individual height adjustments are provided in a like manner for the magnetic heads 302, 304, 306 and 308. The height adjustment assures that the magnetic head units within the magnetic heads are properly aligned with respect to the laterally spaced magnetic tracks of the tape contained within their associated tape cartridge supported within the tape cartridge magazine 128. A screw 320 passing through a slot 324 in mounting plate 254 is tightened and may be glued to maintain the height adjustment for the support arm 310, once made.

Azimuth adjustment for the magnetic head 300, that is, pivotal motion around an axis which is substantially parallel to the major surfaces of the mounting plate 254, is accomplished by adjusting screws 316 and 322 which respectively pass through slots 318 and 326 in the mounting plate 254 and engage the head support arm 310. The screws 316 and 322 are operated in a manner to cause the support arm 310 to rotate about a pivot. As shown, the pivot comprises dimple pairs 328 in the support arm 310 which bears against the mounting plate 254. Once the proper adjustment is made, the screws 316 and 322 may be glued in position. It will be noted that the head assembly 165 provides a plurality of magnetic heads, each of which is adapted to engage a different tape cartridge and contains a plurality of magnetic units. Each of the magnetic heads is independently adjustable for both height and azimuth to insure proper engagement with its associated magnetic tape. The height adjustment is made from a rear edge of the mounting plate 254 and the azimuth adjustment is made from the side of the mounting plate. Consequently, both height and azimuth adjustments are made from readily accessible areas of the tape cartridge changer.

What is claimed is:

1. A tape cartridge player comprising:
    a plurality of receptacles each adapted to receive a tape cartridge of the type including a detent notch;
    cartridge player tape operating means spaced apart from each of the tape cartridges when said cartridges are inserted into said receptacles in a first position;
    means associated with each of said receptacles for engaging each respective tape cartridge notch when the cartridge is initially inserted in said first position in said receptacle to hold the tape cartridge in said first position and for moving the cartridge from said first position to a second position where the cartridge is in engagement with said cartridge player operating means; and
    means for automatically sequentially actuating each of said engaging means to move the tape cartridge in its associated receptacle from said first position to said second position.

2. A tape cartridge player comprising:
    a plurality of receptacles each adapted to receive a tape cartridge of the endless loop variety wherein magnetic tape within the cartridge is passed around a pressure roller at the forward end of the cartridge and across cartridge openings in the front end, the cartridge including a detent notch intermediate the cartridge front and rear ends;
    transducing means;
    a capstan adapted to propel the magnetic tape within each of the tape cartridges when the magnetic tape is sandwiched between the cartridge pressure roller and the player capstan;
    means associated with each of said receptacles adapted to engage each respective cartridge notch for holding said cartridge when the cartridge is initially inserted in a first position within said receptacle wherein the magnetic tape within the cartridge is out of engagement with said player transducing means and capstan and for displacing the tape cartridge from said first position to a second position wherein the magnetic tape within the cartridge is sandwiched between the cartridge pressure roller and said player capstan such that the magnetic tape is adjacent to and propelled across said transducing means; and
    means for automatically sequentially actuating each of said engaging means to move the cartridge in its associated receptacle from said first to said second position.

3. A tape cartridge player comprising:
    a plurality of receptacles each adapted to receive a tape cartridge of the endless loop variety wherein magnetic tape within the cartridge is passed around a pressure roller at the forward end of the cartridge and across cartridge openings in the front end, the cartridge including a detent notch intermediate the cartridge front and rear ends;
    transducing means;
    a capstan adapted to propel the magnetic tape within each of the tape cartridges when the magnetic tape is sandwiched between the cartridge pressure roller and the player capstan;
    means associated with each of said receptacles adapted to engage each respective cartridge notch for displacing the tape cartridge from a first position corresponding to initial insertion within said receptacle wherein the magnetic tape within the cartridge is out of engagement with said player transducing means and capstan to a second position wherein the magnetic tape within the cartridge is sandwiched between the cartridge pressure roller and said player capstan such that the magnetic tape is adjacent to and propelled across said transducing means; and
    said means adapted to engage the cartridge notch holding the tape cartridge when in said first position and including a first bearing portion which nestles within said cartridge notch and a second spring portion anchored at an end remote from said first portion such that said first portion may be deflected towards said transducing means and capstan.

4. A tape cartridge player comprising:
    a plurality of receptacles each adapted to receive a tape cartridge of the endless loop variety wherein magnetic tape within the cartridge is passed around a pressure roller at the forward end of the cartridge and across cartridge openings in the front end, the cartridge including a detent notch intermediate the cartridge front and rear ends;
    transducing means;
    a capstan adapted to propel the magnetic tape within each of the tape cartridges when the magnetic tape is sandwiched between the cartridge pressure roller and the player capstan;
    means associated with each of said receptacles adapted to engage each respective cartridge notch for displacing the tape cartridge from a first position corresponding to initial insertion within said receptacle wherein the magnetic tape within the cartridge is out of engagement with said player transducing means and capstan to a second position wherein the magnetic tape within the cartridge is sandwiched between the cartridge pressure roller and said player capstan such that the magnetic tape is adjacent to and propelled across said transducing means; and
    said means adapted to engage the cartridge notch holding the tape cartridge when in said first position and including a first bearing portion which nestles within said cartridge notch and a second spring portion anchored at an end remote from said first portion such that said first portion may be deflected towards said transducing means and capstan and away from said transducing means and capstan to return said cartridge to its first position when disengagment from said player transducing means is desired.

5. A tape cartridge player as defined in claim 4 including a reciprocating slide engageable with said spring portion to deflect said first bearing portion towards said transducing means and capstan for one direction of slide reciprocation and to deflect said first bearing portion away from said transducing means and capstan for a second direction of slide reciprocation.

6. A tape cartridge player as defined in claim 5 wherein said reciprocating slide includes a cam surface shaped such that initial engagement of said slide with said second spring portion deflects said second portion so that said first bearing portion is urged into the tape cartridge notch in a direction transverse to the cartridge side wall and thereafter with further motion of said reciprocating slide in said one direction, said second spring portion is deflected to move said first bearing portion to urge the tape cartridge toward said tape player transducing means and capstan.

7. A tape cartridge player as defined in claim 6 wherein the cartridge pressure roller and said capstan are biased toward each other with a pressure therebetween of approximately three pounds when said reciprocating slide has engaged said second spring portion such that the tape cartridge is in said second position.

8. A tape cartridge player as defined in claim 7 wherein said second spring portion is a complex spring having resiliency in a direction parallel to the cartridge side wall and in a direction transverse to the cartridge side wall.

9. A tape cartridge player as defined in claim 8 wherein said capstan is an elongated member mounted for rotation between the top and bottom of said player.

10. A tape cartridge player as defined in claim 9 wherein said plurality of receptacles are arranged to position said cartridges in a linear stack.

11. In a tape cartridge player adapted to play a plurality of endless loop tape cartridges, supported in a stacked array, and of the type wherein magnetic tape within the cartridge is passed around a pressure roller at the forward end of the cartridge and across cartridge openings in the front end and having a detent notch intermediate the cartridge front and rear ends, a mechanism comprising:

transducing means;
a capstan adapted to propel the magnetic tape within each of the tape cartridges when the magnetic tape is sandwiched between the cartridge pressure roller and said capstan;
a plurality of pawl means, each of said plurality of pawl means adapted to cooperate with the detent notch of a different one of said plurality of tape cartridges;
a plurality of cams mounted on a rotatable shaft, each of said plurality of cams engaging a different one of said plurality of pawl means and controlled by the angular position of said shaft to position its corresponding pawl means in one of a plurality of positions; and
each of said pawl means disengaged from the detent notch of its corresponding tape cartridge when said shaft is in a first angular position, each of said pawl means engaging the detent notch of its corresponding tape cartridge to maintain said corresponding tape cartridge in a fixed position wherein the magnetic tape within said corresponding cartridge is out of engagement with said transducing means and said capstan when said shaft is in a second angular position, and said pawl means engaging the detent notches of corresponding tape cartridges in sequence to move said corresponding tape cartridges to respective fixed positions wherein the magnetic tape within said corresponding tape cartridges is in engagement with said transducing means and is sandwiched between said corresponding tape cartridge pressure roller and said capstan when said shaft is in a corresponding third angular position.

12. A mechanism as defined in claim 11 wherein each of said plurality of cams includes a continuous cam surface having a first area engaging its corresponding pawl means when said shaft is in said first angular position, a second area engaging said corresponding pawl means when said shaft is in said second angular position and a third area engaging said corresponding pawl means when said shaft is in said third angular position, said first, second and third cam surface areas each being at a different radial distance from the axis of rotation of said shaft.

13. A mechanism as defined in claim 11 wherein each of said plurality of pawl means includes a first member adapted to engage its corresponding cam and a second member rotatably mounted to said first member and adapted to engage the detent notch of its corresponding tape cartridge.

14. A mechanism as defined in claim 13 including a plurality of first spring means each engaging a different one of said plurality of cam means first member to urge said first member to bear against its corresponding cam means.

15. A mechanism as defined in claim 14 including a plurality of second spring means each coupled between a different one of said plurality of cam means first and second members to control the force with which the cartridge pressure roller of each of said plurality of tape cartridges is urged against said capstan when said shaft is in said third position.

16. A mechanism as defined in claim 11 wherein each of said plurality of cams has a different cam surface shaped such that as said shaft rotates through 360° from an initial angular starting position where said plurality of pawl means are all disengaged from the detent notch of their corresponding tape cartridges, said pawl means are first all simultaneously caused to move to engage the detent notch of their corresponding tape cartridge to maintain their corresponding tape cartridges in the fixed position wherein the magnetic tape within their corresponding tape cartridge is out of engagement with said transducing means and said capstan and thereafter each of said pawl means is sequentially caused to move its corresponding tape cartridge by said corresponding tape cartridge detent notch into a fixed position wherein the magnetic tape within said corresponding tape cartridge is in engagement with said transducing means and is sandwiched between said corresponding tape cartridge pressure roller and said capstan.

17. A mechanism as defined in claim 16 wherein said shaft is driven to rotate by a motor, and including first switch means actuated to de-energize said motor when one of said plurality of tape cartridges is moved such that the magnetic tape within said corresponding tape cartridge is in engagement with said transducing means and is sandwiched between said corresponding tape cartridge pressure roller and said capstan.

18. A mechanism as defined in claim 17 wherein each of said plurality of tape cartridges include a conductive surface supported by the magnetic tape within the cartridge and including a second switch means adapted to be actuated by said conductive surface supported on the magnetic tape of each of said plurality of tape cartridges and operable to override said first switch means to cause said motor to be energized and drive said shaft to rotate.

19. A mechanism as defined in claim 18 wherein said second switch means is operable to cause said motor to be energized and drive said shaft to rotate until a different one of said plurality of tape cartridges is moved by its corresponding pawl means into a position wherein the magnetic tape within said corresponding tape cartridge is in engagement with said transducing means and is sandwiched between said corresponding tape cartridge pressure roller and said capstan such that said first switch means is again actuated until said shaft has been driven to rotate through 360° to its initial angular starting position.

20. A mechanism as defined in claim 19 including a third switch means electrically connected in parallel with said first switch means and actuated by a switch actuating cam mounted to said shaft.

21. A tape cartridge player comprising:
 a receptacle adapted to receive a tape cartridge of the type including a detent notch;
 a cartridge player tape capstan spaced apart from the tape cartridge when said cartridge is initially inserted into said receptacle in a first position; and
 means for engaging the tape cartridge notch and providing means for imparting a relative movement between said cartridge and said capstan for moving the cartridge from said first position to a second position where the cartridge is in engagement with said capstan, said engaging means engaging the cartridge notch when the cartridge is in said first position in said receptacle to hold the tape cartridge in said first position.

22. A cartridge player as defined in claim 21 including transducing means spaced apart from the tape of said cartridge when said cartridge is in said first position in said receptacle, and said transducing means in operative engagement with the tape of said cartridge when said cartridge is in said second position in said receptacle.

* * * * *